US010264535B2

(12) United States Patent
Kwak et al.

(10) Patent No.: US 10,264,535 B2
(45) Date of Patent: Apr. 16, 2019

(54) METHOD AND APPARATUS FOR CONTROLLING TRANSMISSION SIGNAL POWER BY TERMINAL IN WIRELESS COMMUNICATION SYSTEM

(71) Applicant: Samsung Electronics Co., Ltd., Gyeonggi-do (KR)

(72) Inventors: Yongjun Kwak, Gyeonggi-do (KR); Juho Lee, Gyeonggi-do (KR); Younsun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 29 days.

(21) Appl. No.: 15/021,199

(22) PCT Filed: Sep. 11, 2014

(86) PCT No.: PCT/KR2014/008488
§ 371 (c)(1),
(2) Date: Mar. 10, 2016

(87) PCT Pub. No.: WO2015/037924
PCT Pub. Date: Mar. 19, 2015

(65) Prior Publication Data
US 2016/0227493 A1 Aug. 4, 2016

(30) Foreign Application Priority Data

Sep. 11, 2013 (KR) .......................... 10-2013-0109168

(51) Int. Cl.
H04W 52/50 (2009.01)
H04W 8/00 (2009.01)
(Continued)

(52) U.S. Cl.
CPC ........... *H04W 52/50* (2013.01); *H04W 8/005* (2013.01); *H04W 52/325* (2013.01);
(Continued)

(58) Field of Classification Search
CPC . H04W 52/50; H04W 76/023; H04W 52/325; H04W 8/005; H04W 76/14; H04W 72/044
See application file for complete search history.

(56) References Cited

U.S. PATENT DOCUMENTS 8,359,038 B2   1/2013   Hakola et al.
8,504,052 B2   8/2013   Hakola et al.
(Continued)

FOREIGN PATENT DOCUMENTS

CN   102088736   6/2011
CN   103079260   5/2013
(Continued)

OTHER PUBLICATIONS

Ang-Hsun Tsai et al., "Intelligent Resource Management for Device-to-Device (D2D) Communications in Heterogeneous Networks".
(Continued)

*Primary Examiner* — Jackie Zuniga Abad
(74) *Attorney, Agent, or Firm* — The Farrell Law Firm, P.C.

(57) ABSTRACT

Provided is a method of signal transmission and reception for a user equipment (UE) in a mobile communication system. The method may include: receiving configuration information for discovery signals from a base station (ENB); determining a transmission resource for a discovery signal on the basis of the received configuration information; and sending a discovery signal utilizing a transmit power determined based on the position of the transmission resource and the configuration information. Accordingly, it is possible to reduce interference effects caused by UEs transmitting a signal and improve communication performance in a mobile communication system.

16 Claims, 12 Drawing Sheets

(51) Int. Cl.

| | | |
|---|---|---|
| *H04W 72/04* | (2009.01) | |
| *H04W 52/32* | (2009.01) | |
| *H04W 76/14* | (2018.01) | |
| *H04W 52/24* | (2009.01) | |
| *H04W 52/38* | (2009.01) | |
| *H04W 52/14* | (2009.01) | |
| *H04W 48/12* | (2009.01) | |

(52) U.S. Cl.
CPC ......... *H04W 72/044* (2013.01); *H04W 76/14* (2018.02); *H04W 48/12* (2013.01); *H04W 52/146* (2013.01); *H04W 52/242* (2013.01); *H04W 52/383* (2013.01)

(56) References Cited

U.S. PATENT DOCUMENTS

| | | | |
|---|---|---|---|
| 2009/0011770 A1* | 1/2009 | Jung | H04L 5/0037 455/452.1 |
| 2009/0191910 A1 | 7/2009 | Athalye et al. | |
| 2009/0325625 A1 | 12/2009 | Hugl et al. | |
| 2011/0080869 A1 | 4/2011 | Walton et al. | |
| 2013/0150061 A1 | 6/2013 | Shin et al. | |

FOREIGN PATENT DOCUMENTS

| | | |
|---|---|---|
| CN | 103249007 | 8/2013 |
| JP | 2011-514035 | 4/2011 |
| JP | 2013507836 | 3/2013 |
| KR | 1020090003946 | 1/2009 |
| KR | 1020090062435 | 6/2009 |
| KR | 1020130065373 | 6/2013 |
| WO | WO 2013/108114 | 7/2013 |

OTHER PUBLICATIONS 2012 15th International Symposium on Wireless Personal Multimedia Communications (WPMC), XP032294381, Sep. 24, 2012, 5 pages.

European Search Report dated Mar. 31, 2017 issued in counterpart application No. 14844374.0-1875, 9 pages.

PCT/ISA/210 Search Report issued on PCT/KR2014/008488 (pp. 3).

PCT/ISA/237 Written Opinion issued on PCT/KR2014/008488 (pp. 5).

Qualcomm Incorporated, "Techniques for D2D Discovery", R1-133600, 3GPP TSG-RAN WG1 #74, Aug. 19-23, 2013, 26 pages.

Nokia, NSN, "D2D Discovery Signal Considerations", R1-133498, 3GPP TSG-RAN WG1 Meeting #74, Aug. 19-23, 2013, 5 pages.

Alcatel-Lucent Shanghai Bell et al., "Consideration of Resource Used and Power Setting for D2D Communication", R1-132069, 3GPP TSG-RAN1 Meeting #73, May 20-24, 2013, 4 pages.

Chinese Office Action dated Sep. 26, 2018 issued in counterpart application No. 201480050123.4, 22 pages.

Japanese Office Action dated Sep. 21, 2018 issued in counterpart application No. 2016-542638, 11 pages.

\* cited by examiner

METHOD AND APPARATUS FOR CONTROLLING TRANSMISSION SIGNAL POWER BY TERMINAL IN WIRELESS COMMUNICATION SYSTEM

TECHNICAL FIELD

The present invention relates to a wireless mobile communication system. More particularly, the present invention relates to a method and apparatus that enable a user equipment to perform transmit power control and multiplexing and also enable a base station to perform corresponding operations for the user equipment in a communication system supporting both device-to-device (D2D) communication and cellular communication.

BACKGROUND ART

As services using wireless mobile communication systems have become highly diversified, there is a strong demand for new technologies that can efficiently support newly introduced services. As such, active efforts are underway to research and develop new schemes and technologies usable in wireless mobile communication systems.

Device-to-device (D2D) communication is a newly introduced technology enabling new types of communication services. Basically, D2D communication enables a user equipment (UE) to directly communicate with another UE in the vicinity thereof. D2D communication supports both D2D discovery, which permits one UE to discover other UEs in the vicinity, and direct communication, which permits the UE to directly communicate with a discovered UE.

Compared to existing cellular communication involving wireless networks and base stations, D2D communication enabling direct communication between UEs requires a smaller amount of radio resources and is more efficient in the usage of radio resources. As D2D communication enables one UE to discover another UE in the proximity, it permits the UE to directly provide necessary information to a desired UE. Hence, advertisement and social networking services (SNS) can be efficiently supported. Currently, active efforts are underway to support D2D technologies in the Long Term Evolution-Advanced (LTE-A) system.

Meanwhile, in D2D communication, multiple UEs scattered in a specific area may simultaneously transmit information to each other. In this case, when a D2D UE transmits data using randomly selected transmit power, in-band emission power caused by this transmission acts as non-negligible noise to other UEs other than a D2D UE trying to receive the data. Particularly, for a system in which D2D communication and wireless cellular communication coexist, it is necessary to clear up the problem that in-band emission power caused by signal transmission of one D2D UE may act as noise to cellular transmission of another UE.

DISCLOSURE OF INVENTION

Technical Problem

The present invention has been made in view of the above problems. Accordingly, an aspect of the present invention is to provide a method and apparatus that enable either D2D UEs or D2D UEs and cellular UEs to simultaneously communicate with each other without causing system performance degradation due to in-band emission power in a mobile communication system and that enable a base station (ENB) to support necessary UE operations.

Solution to Problem

In accordance with an aspect of the present invention, there is provided a method of signal transmission and reception for a user equipment (UE) in a mobile communication system. The method may include: receiving configuration information for discovery signals from a base station (ENB); determining a transmission resource for a discovery signal on the basis of the received configuration information; and sending a discovery signal utilizing a transmit power determined based on the position of the transmission resource and the configuration information.

In accordance with another aspect of the present invention, there is provided a method of signal transmission and reception for a base station (ENB) in a mobile communication system. The method may include: scheduling a transmission resource for a discovery signal in relation to a user equipment (UE); and sending configuration information for discovery signals containing the scheduling result to the UE, wherein the UE determines a transmission resource for a discovery signal on the basis of the configuration information and sends a discovery signal utilizing a transmit power determined based on the position of the transmission resource and the configuration information.

In accordance with another aspect of the present invention, there is provided a user equipment supporting signal transmission and reception in a mobile communication system. The user equipment may include: a transceiver unit to send and receive signals to and from a base station (ENB); and a control unit to perform a process of controlling the transceiver unit, receiving configuration information for discovery signals from the ENB, determining a transmission resource for a discovery signal on the basis of the received configuration information, and sending a discovery signal utilizing a transmit power determined based on the position of the transmission resource and the configuration information.

In accordance with another aspect of the present invention, there is provided a base station supporting signal transmission and reception in a mobile communication system. The base station may include: a transceiver unit to send and receive signals to and from user equipments (UEs); and a control unit to perform a process of controlling the transceiver unit, scheduling a transmission resource for a discovery signal in relation to a UE, and sending configuration information for discovery signals containing the scheduling result to the UE, wherein the UE determines a transmission resource for a discovery signal on the basis of the configuration information and sends a discovery signal utilizing a transmit power determined based on the position of the transmission resource and the configuration information.

Advantageous Effects of Invention

In a feature of the present invention, it is possible to enhance communication performance while reducing interference during signal transmissions of UEs in a mobile communication system. In addition, transmit power control for D2D communication may contribute to reduction of interference and enhancement of communication efficiency in the mobile communication system.

MODE FOR THE INVENTION

Figure 1:
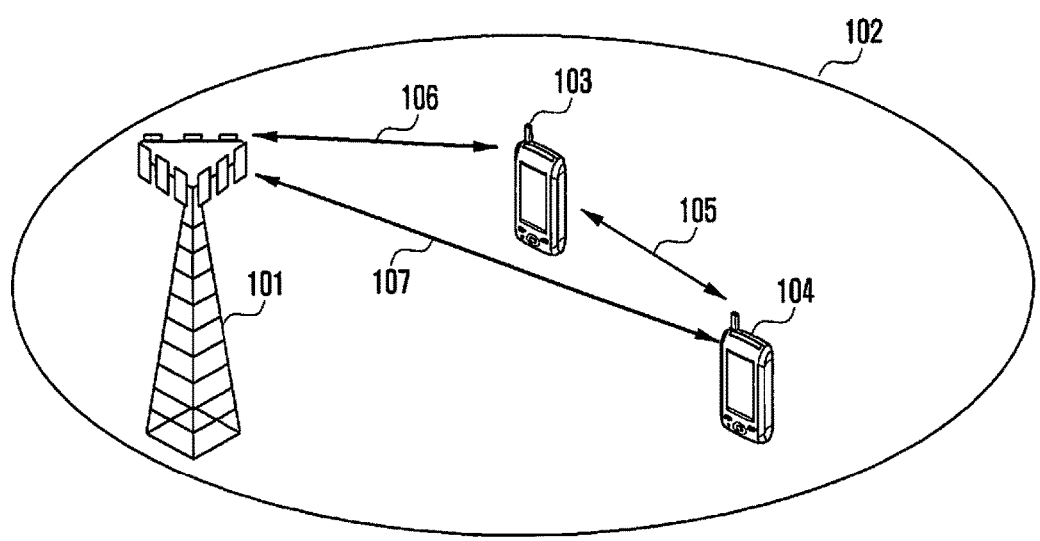
FIG. 1 illustrates support of D2D communication in a wireless communication system according to an embodiment of the present invention.

Hereinafter, embodiments of the present invention are described in detail with reference to the accompanying drawings.

Descriptions of well-known functions and constructions may be omitted for clarity and conciseness. Detailed descriptions of well-known functions and structures incorporated herein may be omitted to avoid obscuring the subject matter of the present invention.

In the drawings, some elements are exaggerated, omitted, or only outlined in brief, and thus may be not drawn to scale. The same or similar reference symbols are used throughout the drawings to refer to the same or like parts.

The aspects, features and advantages of the present invention will be more apparent from the following detailed description taken in conjunction with the accompanying drawings. The description of the various embodiments is to be construed as exemplary only. It should be apparent to those skilled in the art that the following description of various embodiments of the present invention is provided for illustration purpose only and not for the purpose of limiting the present invention as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

Embodiments of the present invention relate to a method and apparatus that configure additional power offsets for transmission of a D2D discovery signal between the ENB and UE in a wireless cellular communication system. The embodiments include a method that configures power offsets according to in-band emission power so as to minimize interference caused by in-band emission of a UE sending a discovery signal and increase discovery performance.

The following description of embodiments of the present invention is focused on OFDM-based wireless communication systems and the 3GPP EUTRA standards. However, it should be understood by those skilled in the art that the subject matter of the present invention is applicable to other communication systems having similar technical backgrounds and channel configurations without significant modifications departing from the scope of the present invention.

In the following description, the terms "base station (ENB)" and "cell" may be used interchangeably. "D2D communication" may refer to both discovery operation (to discover nearby UEs) and direct communication (direct transmission and reception between UEs).

FIG. 1 illustrates support of D2D communication in a wireless communication system according to an embodiment of the present invention.

Referring to FIG. 1, the ENB 101 manages a UE 103 and a UE 104 remaining in its cell 102. As part of management, the ENB 101 may provide wireless services to the UE 103 and UE 104. The UE 103 and the ENB 101 may perform cellular communication via a UE-ENB link 106. The UE 104 and the ENB 101 may perform cellular communication via a UE-ENB link 107. In one embodiment, cellular communication may refer to signal transmission and reception between the ENB and UE.

When D2D communication is enabled, the UE 103 and UE 104 may perform discovery operation or direct communication through a D2D link 105 without traversing the ENB 103.

Device-to-device (D2D) technologies using a cellular mobile communication system such as the LTE-A system may be supported so as not to cause harm to regular UEs using the existing cellular communication system.

In one embodiment, to prevent interference between a D2D UE and a cellular UE (UE utilizing existing UE-ENB communication other than D2D communication), D2D communication may be performed using separate radio resources not overlapping radio resources allocated to cellular communication. Alternatively, a D2D UE and a cellular UE may use common radio resources in such a manner that they do not cause interference to each other.

In the LTE or LTE-A system, frequency division duplexing (FDD) is used for the uplink and downlink.

In FDD, different frequency resources are used for downlink transmission and uplink transmission, facilitating easy separation of uplink transmission and downlink transmission. When D2D communication resources are separately used from existing cellular communication resources in an FDD-based system, the uplink frequency resource tend to be allocated to D2D communication. This is because, in an FDD-based system, it is easier to separately allocate D2D communication resources using uplink frequency resources in comparison to using downlink frequency resources being allocated to multiplex more diverse signals. Additionally, in an FDD-based system considering only cellular UEs, downlink traffic tend to be much greater than uplink traffic due to characteristics of communication services; and as downlink overhead is greater than uplink overhead, the burden of frequency usage on downlink resources is generally greater than that on uplink resources. Hence, using downlink resources as D2D communication resources may increase the overhead on the downlink resources, making it difficult to strike a balance between downlink frequency resource usage and uplink frequency resource usage.

For the above reasons, uplink resources may be used for D2D communication in FDD-based communication systems.

It should be noted that the above description is not about assuring that downlink frequency resources cannot be used as D2D resources but is about the advantages of using uplink frequency resources as D2D resources.

Next, it is necessary to determine how to distinguish between existing cellular communication resources and D2D communication resources in the uplink resources. Orthogonal schemes such as time division multiplexing (TDM) and frequency division multiplexing (FDM) may be used to distinguish between existing cellular communication resources and D2D communication resources. Non-orthogonal schemes reusing the same resources may also be used to distinguish between existing cellular communication resources and D2D communication resources.

As described before, D2D communication is to be supported so as not to cause harm to regular UEs using existing cellular communication. Hence, orthogonal schemes may be preferred at least for D2D discovery. In particular, TDM may be more preferred for D2D discovery.

Specifically, when TDM is used, the ENB does not have to receive cellular signals during a duration when D2D resources are allocated; and D2D transmission is not present during a duration when cellular communication is performed. Thereby, D2D transmission can be performed so as to minimize the influence (e.g. noise) on performing of cellular communication.

Figure 2:
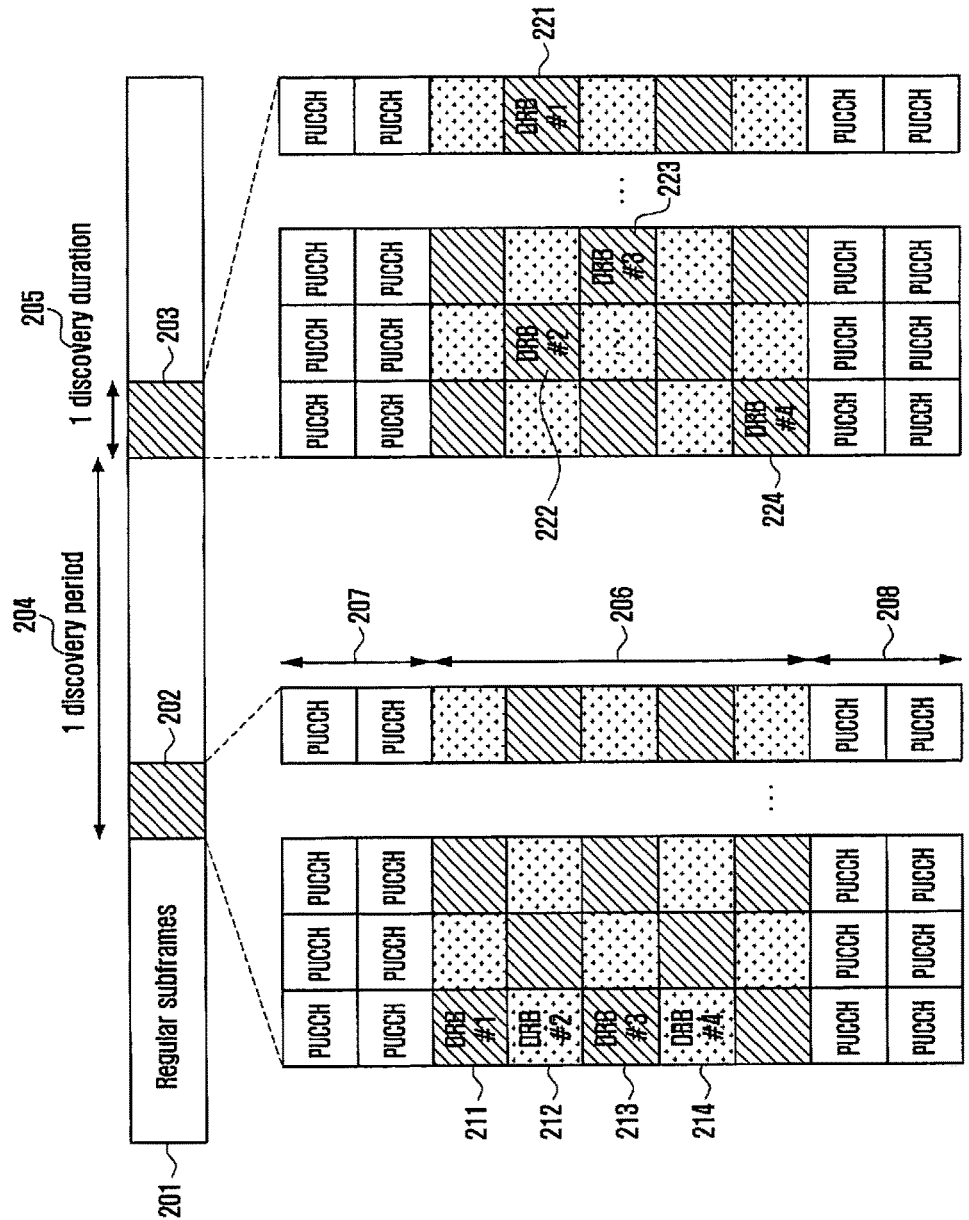
FIG. 2 illustrates TDM-based multiplexing of D2D transmission and cellular transmission according to an embodiment of the present invention.

FIG. 2 illustrates TDM-based multiplexing of D2D transmission and cellular transmission according to an embodiment of the present invention.

In FIG. 2, cellular subframes and D2D subframes are time-division multiplexed as indicated by indicia 201, 202 and 203.

Cellular communication may be configured during a duration indicated by indicia 201, and D2D transmission may be configured during a duration indicated by indicia 202 and a duration indicated by indicia 203.

The durations indicated by indicia 202 and 203 can be referred to as a discovery duration as indicated by indicia 205, and the interval between two successive occurrences of a discovery duration can be referred to as a discovery period as indicated by indicia 204.

In the discovery duration 205 (duration 202 or 203), discovery signals are multiplexed. In the discovery duration 205, PUCCHs may also be present for sending HARQ responses corresponding to downlink cellular transmissions as indicated by indicia 207 and 208. In one embodiment, PUCCHs may be positioned at the two end regions of the frequency domain within the discovery duration.

Discovery signals other than PUCCH are multiplexed in the discovery duration 205. To this end, as indicated by indicia 206, multiple resources for discovery signals, i.e. discovery resource blocks (DRBs), are arranged in the form of a time-frequency structure. In one embodiment, one DRB may have a given size corresponding to one or more time-frequency units, and multiple DRBs may be multiplexed as a grid form in the discovery duration as indicated by indicia 206. For example, the DRB may be set equal to one resource block (PRB) consisting of one subframe and 12 subcarriers. A UE may transmit a discovery signal at one of such multiplexed DRBs.

In another embodiment, multiple UEs may send their discovery signals at one DRB. A UE may determine the DRB to be used to send a discovery signal according to a given or preset rule and may send a discovery signal at the determined DRB. For example, UE 1 may send a discovery signal using DRB 211; UE 2 may send a discovery signal using DRB 212; UE 3 may send a discovery signal using DRB 213; and UE 4 may send a discovery signal using DRB 214. The relationship between UEs and DRBs may be determined in a relative way.

When UEs 1 to 4 send discovery signals at the same subframe as described above, each of them cannot receive a discovery signal from the others. That is, UE 1 cannot receive a discovery signal from UEs 2, 3 and 4; UE 2 cannot receive a discovery signal from UEs 1, 3 and 4; UE 3 cannot receive a discovery signal from UEs 1, 2 and 4; and UE 4 cannot receive a discovery signal from UEs 1, 2 and 3. To solve the problem that each of UEs sending discovery signals at the same subframe cannot receive a discovery signal from the others, time-frequency hopping may be applied to change DRB positions for each discovery duration. As indicated by indicia 221 to 224, positions of DRBs 1 to 4 are different from the previous ones indicated by indicia 211 to 214. In this case, each of UEs 1, 2, 3 and 4 may receive a discovery signal from the others. As such, by placing DRBs at different positions on the time-frequency grid for different discovery durations, a first UE, which has failed to receive a discovery signal from a second UE during a discovery duration, may receive a discovery signal from the second UE during the next discovery duration. The scheme for time-frequency hopping may be determined according to at least one of UE settings and messages sent by the ENB.

Hereinabove, a description is given of multiplexing of D2D discovery signals and cellular transmissions, multiplexing of discovery signal resources in discovery durations, and change of DRB mappings in discovery durations. Next, a description is given of problems that may be caused by in-band emission power due to D2D operation.

In one embodiment, a UE transmits a discovery signal using one DRB. When the UE transmits using a first frequency block of a given frequency band, transmit power also occurs in a second frequency block of the frequency band in relation to the transmit power used in the first frequency block. This is referred to as in-band emission power. For example, referring to FIG. 2, when UE 1 sends a discovery signal of 23 dBm at DRB 1 (211), a power of −7 dBm, differing by (e.g.) 30 dB from the transmit power used at DRB 1 (211), occurs at another DRB (other than DRB 1 (211)) in the same subframe. Power occurring in such a way may function as additional noise or interference to another UE using the corresponding region for signal transmission or reception. A description is given of characteristics of in-band emission power with reference to FIG. 3.

Figure 3:
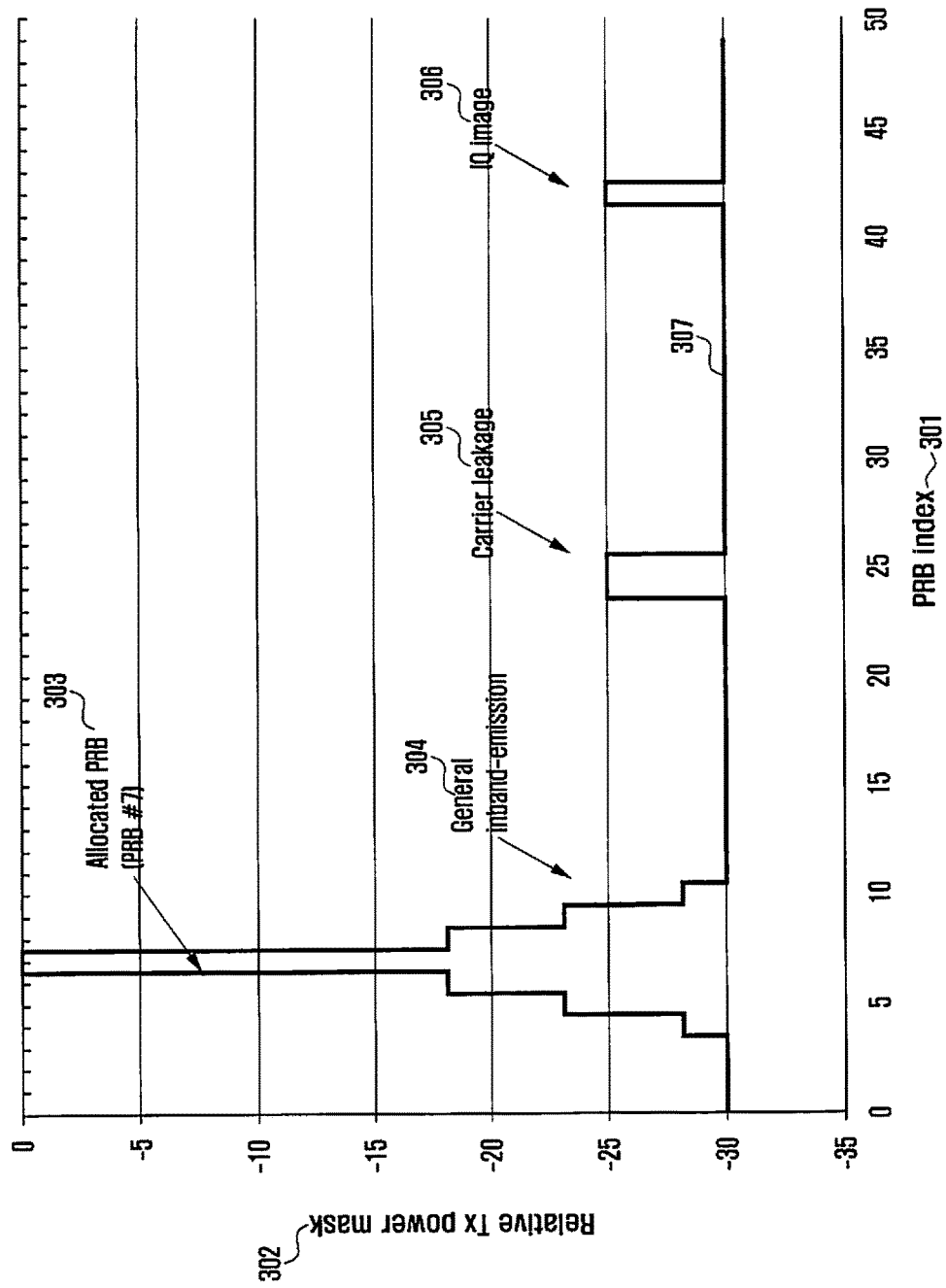
FIG. 3 illustrates emission power during signal transmission of a UE according to an embodiment of the present invention.

FIG. 3 illustrates emission power during signal transmission of a UE according to an embodiment of the present invention.

FIG. 3 depicts a typical pattern of in-band emission power occurring in a whole frequency band. In-band emission power should not exceed the values shown in the drawing (requirements for in-band emission power). In practical realization, in-band emission power may take the same values shown in the drawing.

In FIG. 3, the horizontal axis indicates PRB indexes (i.e. frequency axis) as indicated by indicia 301, and the vertical axis indicates the relative magnitude of the transmit power as indicated by indicia 302.

When a UE transmits data at PRB #7 (allocated frequency) using a specific transmit power, a power of −30 dB occurs across the entire band as indicated by indicia 307. In addition, the generated power may have a value greater than −30 dB at two or three PRBs next to the allocated PRB as indicated by indicia 304. Here, the generated power may take the form of steps at two or three PRBs next to the allocated PRB.

The generated power may have a value greater than −30 dB at PRB #24 or #25 in the middle of the band owing to additional power emission caused by carrier leakage as indicated by indicia 305.

The generated power may have a value greater than −30 dB at a PRB placed on the other side symmetrically with respect to the allocated PRB (i.e. at the image frequency of the allocated frequency) owing to additional power emission caused by IQ imbalance as indicated by indicia 306. In the drawing, additional power emission caused by IQ imbalance may occur at PRB #42.

As described above, when a UE transmits a discovery signal using an allocated DRB, in-band emission power occurs at different DRBs other than the allocated DRB owing to one or more of the above factors. This in-band emission power may affect performance of a discovery signal of another UE and PUCCH transmission arranged near the DRBs.

Figure 4:
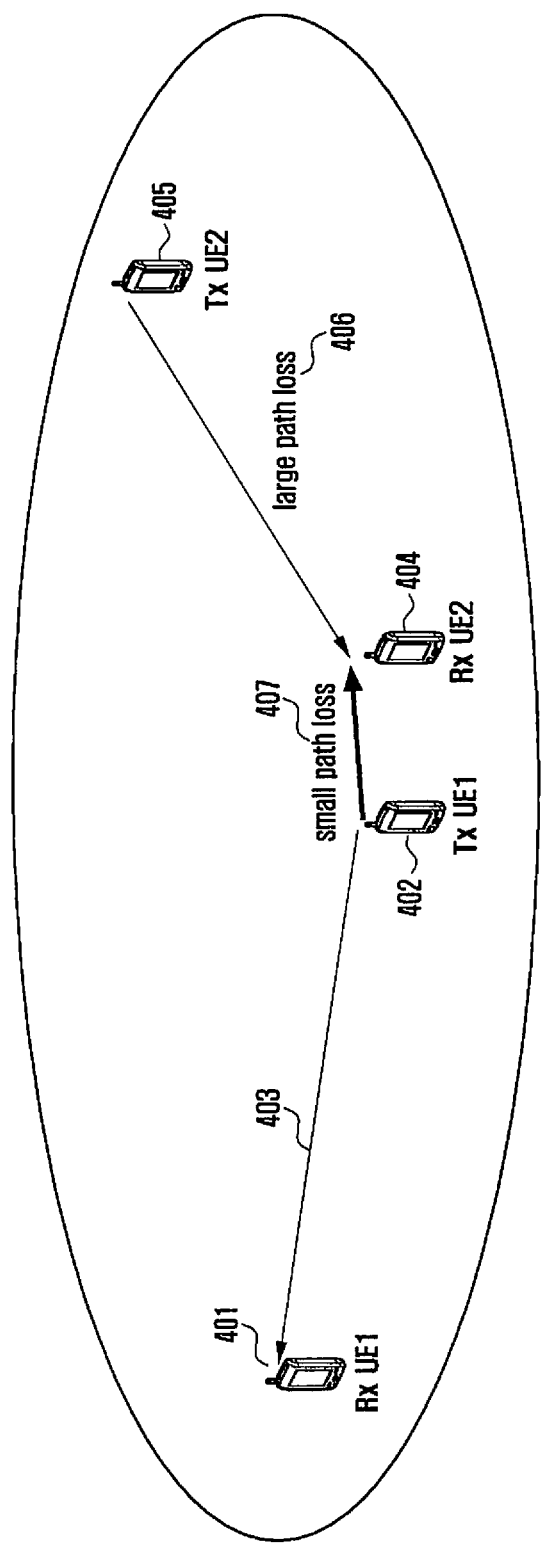
FIG. 4 depicts interference occurring in D2D communication according to an embodiment of the present invention.

FIG. 4 depicts interference occurring in D2D communication according to an embodiment of the present invention.

In FIG. 4, UE 402 sends a discovery signal to UE 401 and UE 404 using frequency resource 1. During the same subframe, UE 405 sends a discovery signal using frequency resource 2 different from frequency resource 1.

As the distance from UE 402 to UE 404 is very small, the signal from UE 402 to UE 404 may experience smaller path loss 407 in comparison to other signals 403 and 406.

On the other hand, as the distance from UE 405 to UE 404 is larger than that from UE 402 to UE 404, the signal from UE 405 to UE 404 may experience larger path loss 406 in comparison to the signal from UE 402 to UE 404. In this case, for UE 404 trying to receive the discovery signal from UE 405 by use of frequency resource 2, the receive power of the discovery signal from UE 402 may be higher than or similar to that of the discovery signal from UE 405 received through frequency resource 2 in consideration of path loss 407 because of in-band emission power caused by transmission of the discovery signal of UE 402 at frequency resource 1.

Thereby, UE 404 may fail to receive the discovery signal from UE 405, lowering overall performance of D2D discovery operation. This problem may become worse when frequency resource 2 is allocated at frequency positions where in-band emission power is high (e.g. PRBs 304, 305 and 306 in FIG. 3).

Accordingly, embodiments of the present invention propose a method that can reduce performance degradation due to in-band emission power and increase overall performance by configuring additional power offsets at suitable DRBs in consideration of in-band emission power. The method is described below.

Embodiment 1. Configuring DRB Power Offsets to Prevent PUCCH Reception Performance Degradation As indicated by indicia 304 in FIG. 3, the closer to the DRB at which a discovery signal is sent, the higher is in-band emission power. That is, when a discovery signal is sent at a DRB near a resource region in which PUCCH transmission is made, additional output power generated by transmission of the discovery signal may act as additional noise to PUCCH reception in the cell. Such an additional noise effect may lower PUCCH reception performance.

Figure 5:
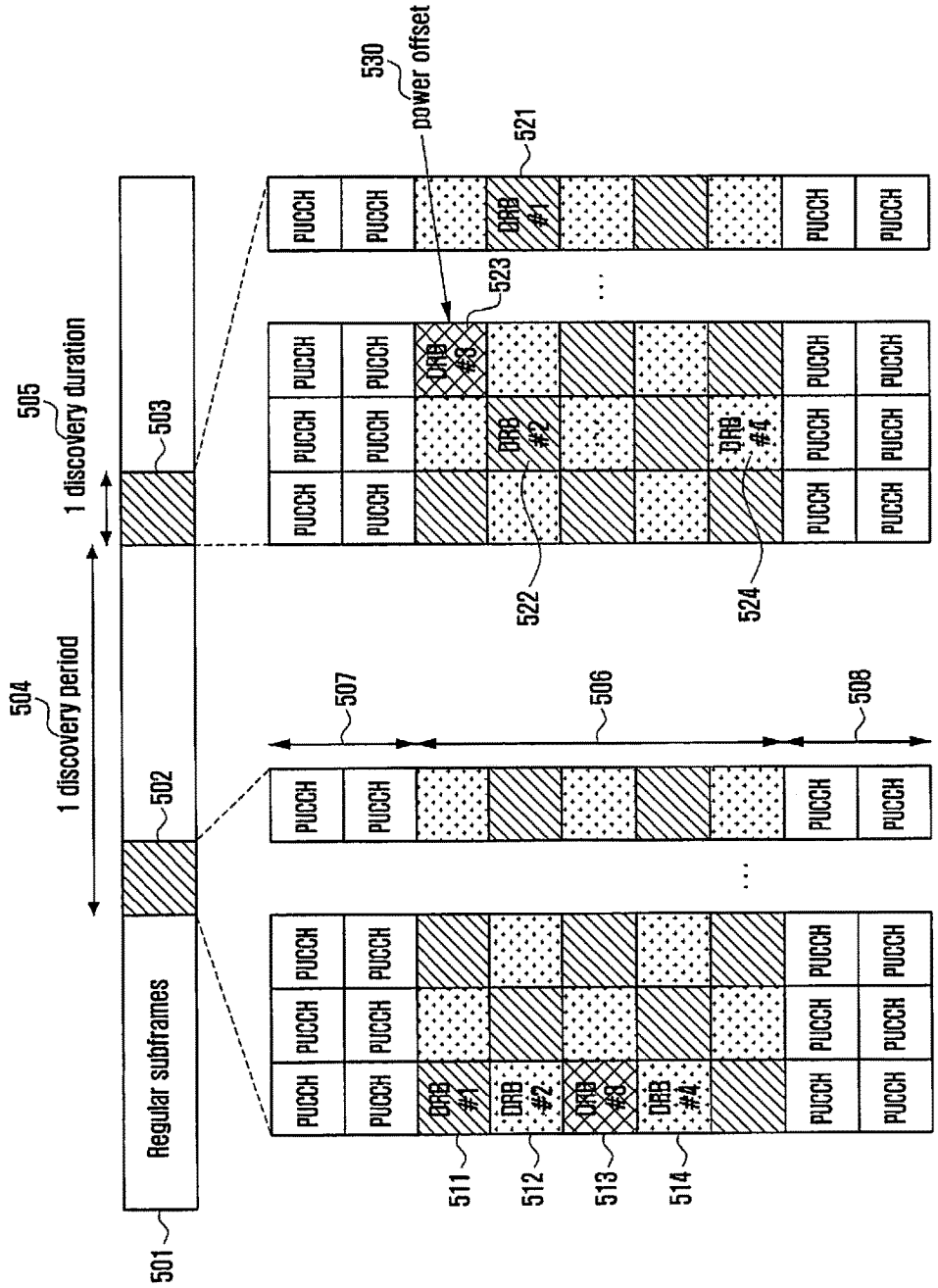
FIG. 5 illustrates configuration of DRB power offsets to avoid degradation of PUCCH reception performance according to a first embodiment of the present invention.

FIG. 5 illustrates configuration of DRB power offsets to avoid degradation of PUCCH reception performance according to the first embodiment of the present invention.

In FIG. 5, cellular subframes and D2D subframes are time-division multiplexed as indicated by indicia 501, 502 and 503.

Cellular communication may be configured in the duration 501, and transmission of a D2D discovery signal may be configured in the durations 502 and 503.

The durations indicated by indicia 502 and 503 can be referred to as a discovery duration as indicated by indicia 505, and the interval between two successive occurrences of a discovery duration can be referred to as a discovery period as indicated by indicia 504.

In the discovery duration 505, discovery signals are multiplexed. In the discovery duration 505, PUCCHs may also be present for sending HARQ responses corresponding to downlink cellular transmissions as indicated by indicia 507 and 508. Here, PUCCHs may be positioned at the two end regions of the frequency domain within the discovery duration. In the discovery duration, discovery signals are multiplexed in resources other than PUCCH. To this end, as indicated by indicia 506, multiple resources for discovery signals, i.e. discovery resource blocks (DRBs), are arranged in the form of a time-frequency structure.

One DRB may have a given size in time-frequency units, and multiple DRBs may be multiplexed as a grid form in the discovery duration as indicated by indicia 506. The DRB grid may have different forms according to embodiments.

A UE may determine a DRB to be used to send a discovery signal according to a given rule or a rule preset by the ENB and may send a discovery signal using the determined DRB.

In the present embodiment, either the UE may autonomously select a DRB to be used for discovery signal transmission, or the ENB may select a DRB to be used for discovery signal transmission and notify the corresponding UE of the selected DRB.

For example, UE 1 may send a discovery signal using DRB 511; UE 2 may send a discovery signal using DRB 512; UE 3 may send a discovery signal using DRB 513; and UE 4 may send a discovery signal using DRB 514.

When UEs 1 to 4 send discovery signals at the same subframe as described above, each of them cannot receive a discovery signal from the others. That is, during discovery duration 502, UE 1 cannot receive a discovery signal from UEs 2, 3 and 4; UE 2 cannot receive a discovery signal from UEs 1, 3 and 4; UE 3 cannot receive a discovery signal from UEs 1, 2 and 4; and UE 4 cannot receive a discovery signal from UEs 1, 2 and 3.

Time-frequency hopping may be applied to solve the problem that each of UEs sending discovery signals at the same subframe cannot receive a discovery signal from the others. During discovery duration 503, as indicated by indicia 521 to 524, positions of DRBs 1 to 4 are different from the ones during previous discovery duration 502. The scheme for time-frequency hopping may be determined according to at least one of a preset rule and a rule set by the ENB.

After time-frequency hopping, UE 1 may receive a discovery signal from UEs 2, 3 and 4; UE 2 may receive a discovery signal from UEs 1 and 3; UE 3 may receive a discovery signal from UEs 1, 2 and 4; and UE 4 may receive a discovery signal from UEs 1 and 3.

Although UE 2 and UE 4 cannot discover each other during discovery duration 502 or 503, they can discover each other during the next discovery duration through time-frequency hopping. In this manner, by placing DRBs at different positions on the time-frequency grid for different discovery durations, a first UE, which has failed to receive a discovery signal from a second UE during a discovery duration, may receive a discovery signal from the second UE during the next discovery duration.

Meanwhile, a UE may receive a reference signal from the ENB and measure path loss from the ENB. When path loss between a UE and ENB is very small, large in-band emission of the UE may reach the ENB, reducing PUCCH reception performance at the ENB.

This problem may become worse when in-band emission power is high as indicated by indicia 304 of FIG. 3 in the event that a DRB used by a UE with small path loss for discovery signal transmission is positioned next to PUCCH.

Hence, to solve the above problem, the present embodiment proposes a method that varies the transmit power according to whether a DRB used by a UE with small path loss (i.e. close to the ENB) is positioned next to a PUCCH transmission resource. More specifically, the proposed method assigns a different transmit power value for a discovery signal to a UE according to the distance between the UE and the ENB and the position of a DRB transmission resource allocated to the UE.

Here, the transmit power of a UE for transmission of a discovery signal may be determined according to the following options.

1. A fixed value, for example, maximum UE transmit power
2. A value signaled by the wireless network including the ENB
3. A value set in consideration of path loss with respect to the ENB
4. A value set by a combination of the above options.

In the method of the present embodiment, a different power offset is applied to the transmit power used by a UE to send a discovery signal according to the position of a DRB allocated to the UE. For example, as indicated by indicia 513, when the DRB used by UE 3 for discovery signal transmission is positioned far from PUCCH resources, the existing transmit power may be used as is. On the other hand, as indicated by indicia 523, when the DRB used by UE 3 for discovery signal transmission is positioned close or next to PUCCH resources, an additional power offset (negative value) is set so as to reduce the influence of in-band emission caused by discovery signal transmission on PUCCHs. The power offset may be determined using the following equation.

$$\text{Tx\_Power}(i) = \text{Tx\_power\_ref} + IE\_\text{Offset}(i)$$

Tx_Power(i) indicates the transmit power at DRB position i, and Tx_power_ref indicates the reference transmit power. Here, i denotes the distance between the DRB and PUCCH resource block. For example, i is set to 1 (i=1) for a DRB immediately next to a PUCCH resource block, i is set to 2 (i=2) for a DRB next to a PUCCH resource block, and so on. IE_Offset(i) varies depending on i. For example, IE_Offset(1)=−12, IE_Offset(2)=−7, and IE_Offset(3)=−2. As such, it is possible to adjust the transmit power at a specific DRB according to the position relationship between the DRB and PUCCH resource block.

The power offset at a specific DRB position (i.e. IE_Offset(i)) may be preset for all UEs or may be notified by the ENB to UEs via SIB signaling or to a specific UE via higher layer signaling. The power offset may be set for any UE trying to send a discovery signal, or only for a UE placed near the ENB (e.g. UE with reference signal measurements or UE with path loss smaller than a threshold value). The power offset may be set on the basis of the distance between a UE and the ENB. The distance between a UE and the ENB may be determined on the basis of one or more reference signal values measured by the UE or ENB. When power control is performed on the basis of path loss measurement based on reference signals from the ENB, both the reference transmit power (Tx_Power_ref) may be set through such power control and the power offset may be set based on DRB positions. For example, the reference transmit power may be determined using the following equation.

$$\text{Tx\_Power\_ref} = \min\{\text{Max\_Tx\_Power}, f(D2D), g(PL\_eNB)\}$$

Max_Tx_Power indicates the maximum available power of the Tx D2D UE, f(D2D) indicates the transmit power determined according to the service type of the discovery signal, and g(PL_eNB) indicates the transmit power determined according to the path loss between the UE and ENB (PL_eNB). Here, g(PL_eNB) can be determined as follows.

$$g(PL\_eNB) = Rx\_Power\_eNB + PL\_eNB$$

Rx_Power_eNB indicates the target receive power of the ENB from the UE. Values for Rx_Power_eNB and IE_Offset_ref may be set by the ENB for the UE.

Figure 6:
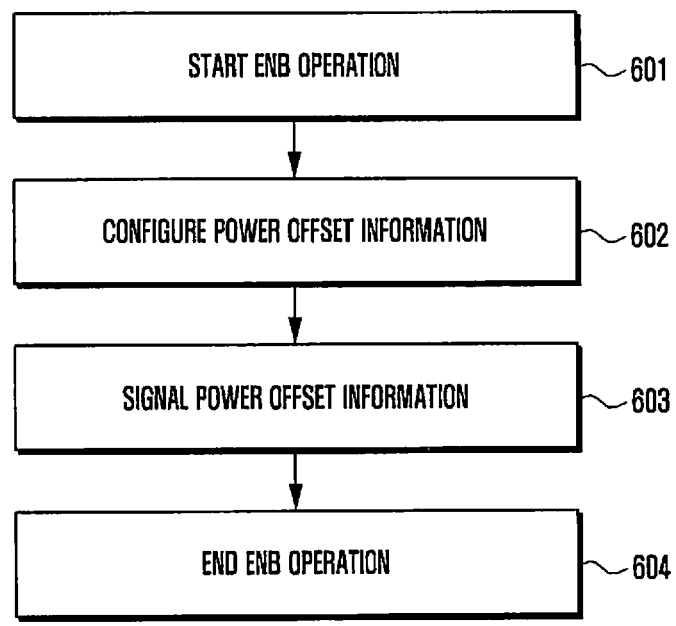
FIG. 6 is a flowchart for ENB operations according to the first embodiment of the present invention.

FIG. 6 is a flowchart for ENB operations according to the first embodiment of the present invention.

In the present embodiment, it is assumed that power offset information is signaled by the ENB to UEs. In another embodiment, power offset information may be pre-configured at UEs.

Referring to FIG. 6, at step 601, the ENB starts operation.

At step 602, the ENB configures power offset information. As described before, the power offset information may be determined according to the relationship between DRB positions and PUCCH resource block positions. Specifically, a negative value with larger magnitude may be assigned as a power offset to a DRB positioned close to a PUCCH resource block, and a negative value with smaller magnitude may be assigned as a power offset to a DRB positioned far from a PUCCH resource block.

At step 603, the ENB notifies the configured power offset information to the corresponding UE. The ENB may notify power offset information to a specific UE by use of at least one of SIB signaling, RRC signaling, and dynamic signaling.

At step 604, the ENB ends operation.

Figure 7:
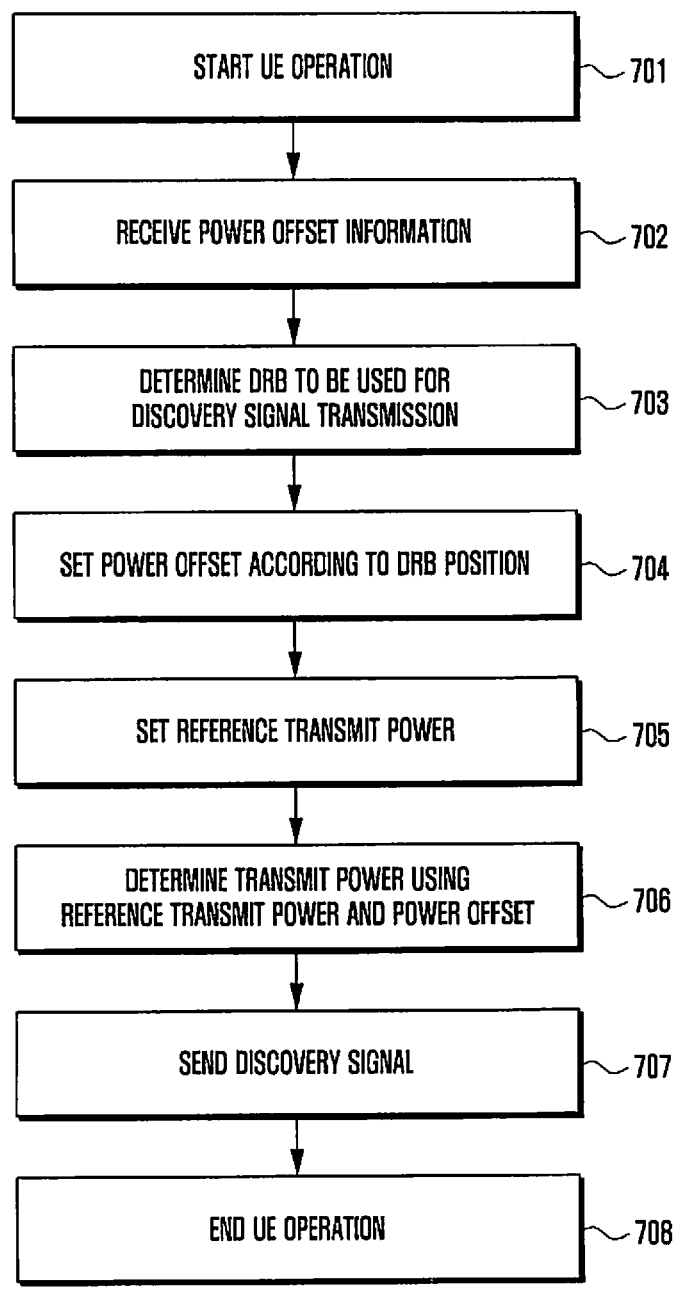
FIG. 7 is a flowchart for UE operations according to the first embodiment of the present invention.

FIG. 7 is a flowchart for UE operations according to the first embodiment of the present invention.

Referring to FIG. 7, at step 701, the UE starts operation.

At step 702, the UE receives power offset information from the corresponding ENB. Step 702 may be selectively executed. When the UE configures power offset settings using pre-stored information without receiving power offset information, step 702 may be skipped.

At step 703, the UE selects a DRB that is to be used for discovery signal transmission at a desired discovery duration. DRB selection may be performed by the UE or the ENB. The position of a selected DRB may be different for each transmission owing to application of time-frequency hopping.

At step 704, the UE sets a power offset according to the position of the selected DRB. The power offset may be determined on the basis of the power offset information received at step 702 or configuration information pre-stored in the UE.

At step 705, the UE determines a reference transmit power. The reference transmit power may be determined on the basis of ENB signaling or values pre-stored in the UE.

At step 706, the UE determines a transmit power using the reference transmit power and power offset. Here, the transmit power may be set to the sum of the reference transmit power and the power offset.

At step 707, the UE sends a discovery signal using the determined transmit power.

At step 708, the UE ends operation.

Embodiment 2. Power Control by Corresponding ENB

As indicated by indicia 305 in FIG. 3, in-band emission power is higher at a DRB using the center frequency compared with other DRBs. Hence, reception performance of a discovery signal sent at the DRB using the center frequency may be lower than that of a discovery signal sent at another DRB owing to in-band emission power caused by discovery signal transmission at other DRBs. To solve the problem of discovery signal reception performance degradation caused by in-band emission power, the present embodiment describes a method for setting a power offset at the center frequency DRB with reference to FIG. 8.

Figure 8:
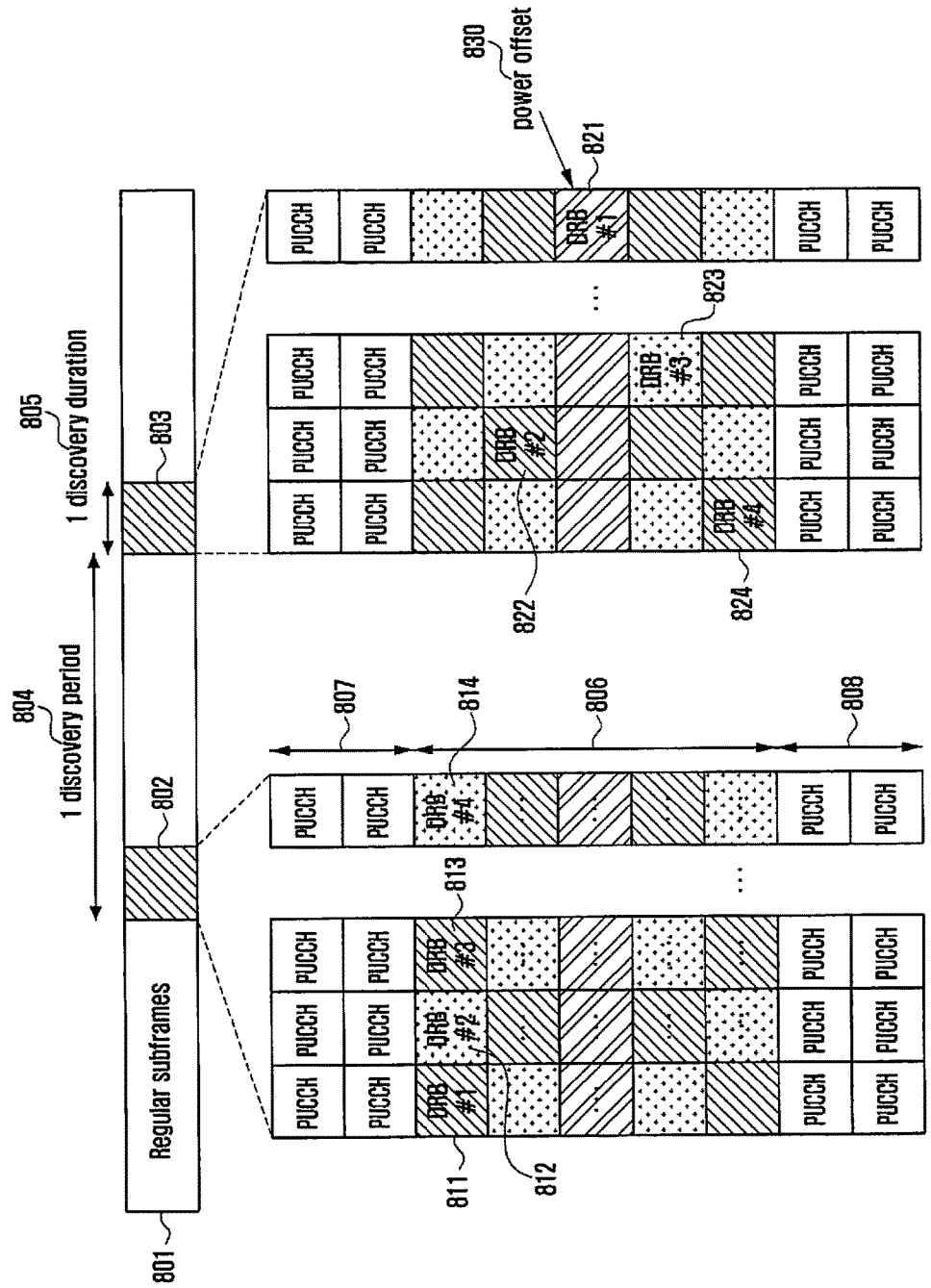
FIG. 8 illustrates configuration of center frequency DRB power offsets to avoid degradation of discovery signal reception performance due to in-band emission power according to a second embodiment of the present invention.

FIG. 8 illustrates configuration of center frequency DRB power offsets to avoid degradation of discovery signal reception performance due to in-band emission power according to the second embodiment of the present invention.

In FIG. 8, cellular subframes and D2D subframes are time-division multiplexed as indicated by indicia 801, 802 and 803. Cellular communication may be configured in the duration 801, and transmission of a D2D discovery signal may be configured in the discovery durations 802 and 803, the interval between which is referred to as the discovery period 804. In a discovery duration, discovery signals are multiplexed, and PUCCHs may also be present for sending HARQ responses corresponding to downlink cellular transmissions. Here, PUCCHs may be positioned at the two end regions of the frequency domain within the discovery duration as indicated by indicia 807 and 808.

In the discovery duration, discovery signals are multiplexed in resources other than PUCCH. To this end, as indicated by indicia 806, multiple resources for discovery signals, i.e. DRBs, are arranged in the form of a time-frequency structure. One DRB may have a given size in time-frequency units, and multiple DRBs may be multiplexed as a grid form in the discovery duration as indicated by indicia 806. A UE may determine a DRB to be used to send a discovery signal according to a preset rule and send a discovery signal using the determined DRB. The UE may autonomously select a DRB to be used for discovery signal transmission, or the ENB may select such a DRB and notify the corresponding UE of the selected DRB. For example, UE 1 may send a discovery signal using DRB 811; UE 2 may send a discovery signal using DRB 812; UE 3 may send a discovery signal using DRB 813; and UE 4 may send a discovery signal using DRB 814.

When time-frequency hopping is applied, during discovery duration 803, as indicated by indicia 821 to 824, subframe-frequency positions of DRBs 1 to 4 are different from the ones during previous discovery duration 802. For example, UE 1 sends a discovery signal using DRB 811 during discovery duration 802, and sends a discovery signal using DRB 821 during discovery duration 803. Namely, UE 1 sends a discovery signal via DRB 821 using the center frequency. As described before, as in-band emission power caused by a different UE is high at a DRB using the center frequency, reception performance of a discovery signal sent at the DRB using the center frequency may be low. Hence, when a discovery signal is sent at the center frequency DRB using a transmit power identical to that used at a different DRB, reception performance of the discovery signal may be low. As such, the present embodiment describes a method that enables a UE using a center frequency DRB to send a discovery signal with a higher transmit power by setting additional power offset 830. This can be represented by the following equation.

$$Tx\_Power(i) = Tx\_power\_ref + IE\_Offset(i)$$

Tx_Power(i) indicates the transmit power at DRB position i, and Tx_power_ref indicates the reference transmit power. Here, i denotes the position of the DRB. For example, IE_Offset(i) is a fixed positive value for a DRB using the center frequency, and is zero for a DRB not using the center frequency.

The power offset at the position of a DRB using the center frequency (i.e. IE_Offset(i)) may be preset for all UEs, or may be notified by the ENB to UEs via SIB signaling or to a specific UE via higher layer signaling. The power offset may be set for any UE trying to send a discovery signal, or only for a UE placed near the ENB (e.g. UE with reference signal measurements or UE with path loss smaller than a threshold value). When power control is performed on the basis of path loss measurement based on reference signals from the ENB, both the reference transmit power (Tx_Power_ref) may be set through such power control and the power offset may be set based on DRB positions. For example, the reference transmit power may be determined using the following equation.

$$Tx\_Power\_ref = \min\{Max\_Tx\_Power, f(D2D), g(PL\_eNB)\}$$

Max_Tx_Power indicates the maximum available power of the Tx D2D UE, f(D2D) indicates the transmit power determined according to the service type of the discovery signal, and g(PL_eNB) indicates the transmit power determined according to the path loss between the UE and ENB (PL_eNB). Here, g(PL_eNB) can be determined as follows.

$$g(PL\_eNB) = Rx\_Power\_eNB + PL\_eNB$$

Rx_Power_eNB indicates the target receive power of the ENB from the UE. Values for Rx_Power_eNB and IE_Offset_ref may be set by the ENB for the UE.

Figure 9:
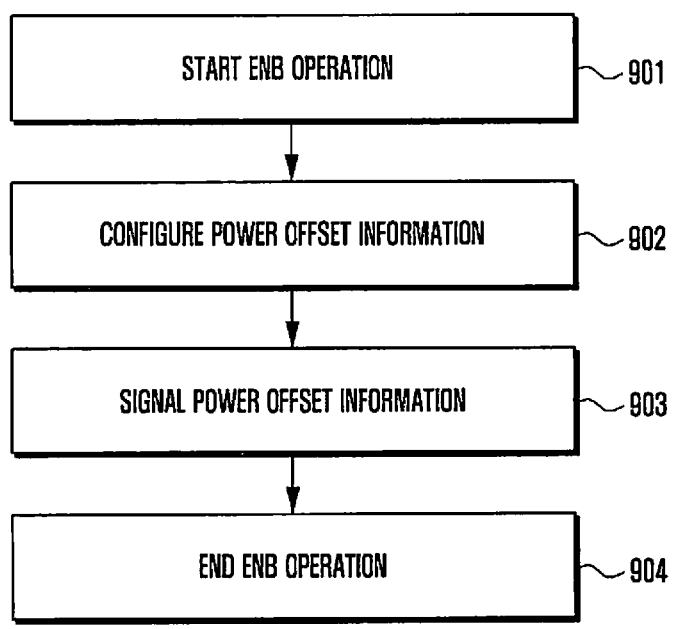
FIG. 9 is a flowchart for ENB operations according to the second embodiment of the present invention.

FIG. 9 is a flowchart for ENB operations according to the second embodiment of the present invention.

In the present embodiment, it is assumed that power offset information is signaled by the ENB to UEs. In another embodiment, power offset information may be pre-configured at UEs.

Referring to FIG. 9, at step 901, the ENB starts operation.

At step 902, the ENB configures power offset information. As described before, the power offset information may be determined according to relative positions in the uplink frequency band. A positive value may be assigned as a power offset to a resource using the center frequency.

At step 903, the ENB notifies the configured power offset information to the corresponding UE. The ENB may notify power offset information to a specific UE by use of at least one of SIB signaling, RRC signaling, and dynamic signaling.

At step 904, the ENB ends operation.

Figure 10:
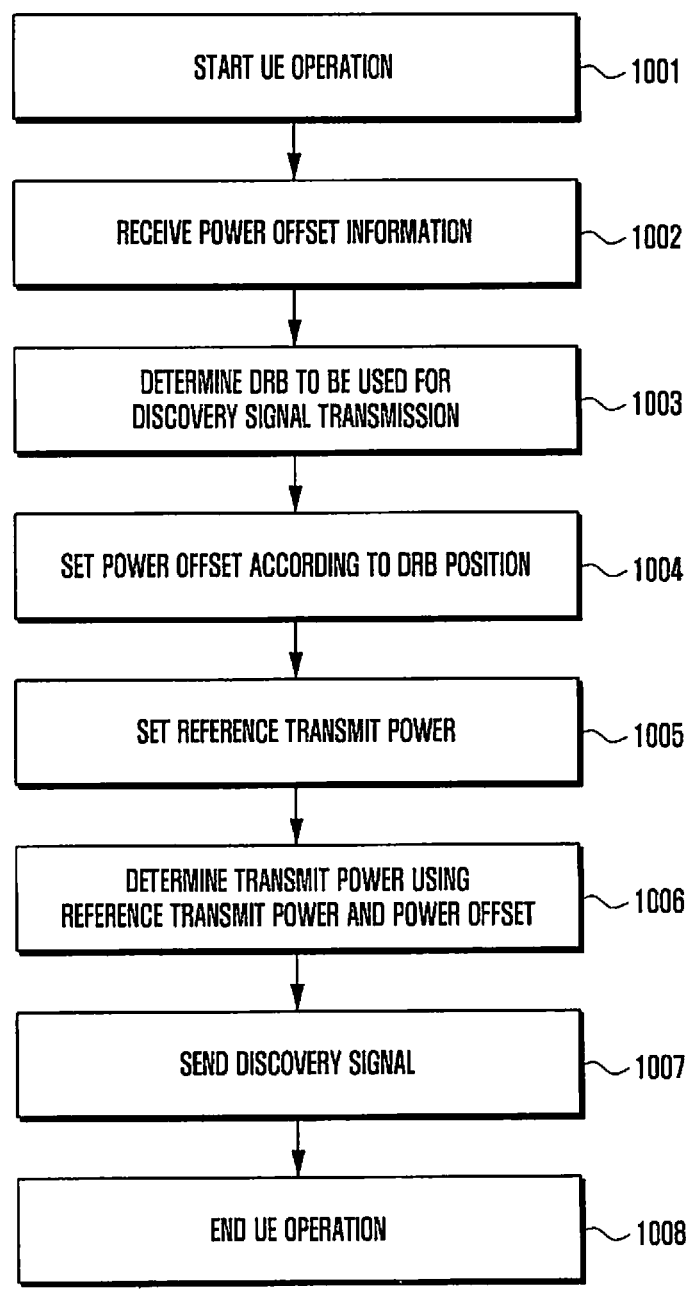
FIG. 10 is a flowchart for UE operations according to the second embodiment of the present invention.

FIG. 10 is a flowchart for UE operations according to the second embodiment of the present invention.

Referring to FIG. 10, at step 1001, the UE starts operation.

At step 1002, the UE receives power offset information from the corresponding ENB. Step 1002 may be selectively executed. When the UE configures power offset settings using pre-stored information without receiving power offset information, step 1002 may be skipped.

At step 1003, the UE selects a DRB that is to be used for discovery signal transmission at a desired discovery duration. DRB selection may be performed by the UE or the ENB. The position of a selected DRB may be different for each transmission owing to application of time-frequency hopping.

At step 1004, the UE sets a power offset according to the position of the selected DRB. The power offset may be determined on the basis of the power offset information received at step 1002 or configuration information pre-stored in the UE.

At step 1005, the UE determines a reference transmit power. The reference transmit power may be determined on the basis of ENB signaling or values pre-stored in the UE.

At step 1006, the UE determines a transmit power using the reference transmit power and power offset. Here, the transmit power may be set to the sum of the reference transmit power and the power offset.

At step 1007, the UE sends a discovery signal using the determined transmit power.

At step 1008, the UE ends operation.

Figure 11:
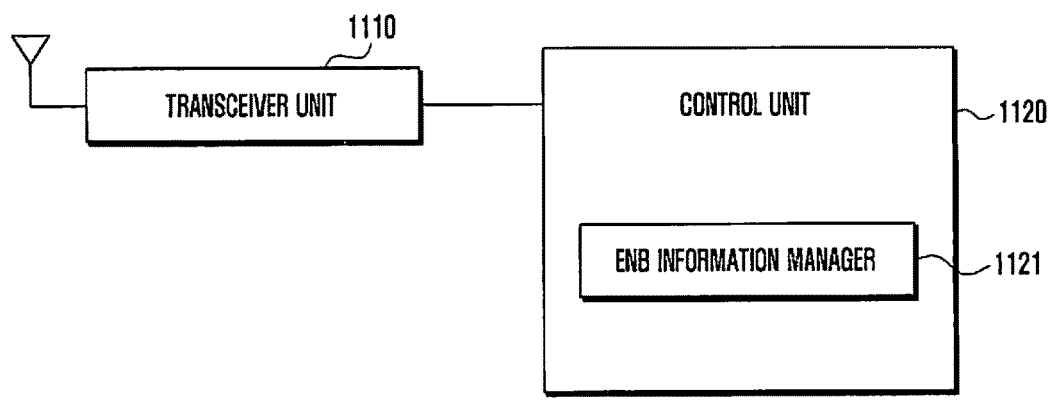
FIG. 11 is a block diagram of a base station (ENB) according to an embodiment of the present invention.

FIG. 11 is a block diagram of a base station (ENB) according to an embodiment of the present invention. Referring to FIG. 11, the ENB may include a transceiver unit 1110 and a control unit 1120.

The transceiver unit 1110 sends and receives signals to and from a node of a wireless communication system through a wired or wireless interface. For example, the transceiver unit 1110 may send and receive control information or data to and from a UE.

The control unit 1120 controls signal flows between internal blocks for ENB operation. For example, the control unit 1120 may control a series of operations for adjusting the transmit power of a D2D UE trying to send a discovery signal. To this end, the control unit 1120 may include an ENB information manager 1121.

The ENB information manager 1121 may control transmission of ENB related information, which is needed for adjusting the transmit power of a D2D UE trying to send a discovery signal, to the UE. In one embodiment, the ENB information manager 1121 may control transmission of power offset information based on DRB positions to a UE.

In another embodiment, the control unit 1120 may control a process of obtaining D2D configuration information from a neighboring ENB, configuring transmission/reception durations for D2D communication, and sending information on the configured transmission/reception durations to UEs.

Figure 12:
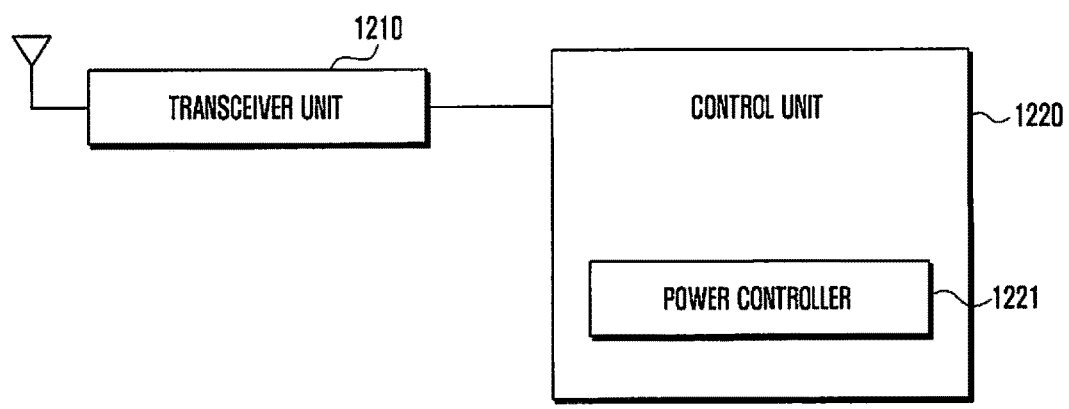
FIG. 12 is a block diagram of a user equipment (UE) according to an embodiment of the present invention.

FIG. 12 is a block diagram of a user equipment (UE) according to an embodiment of the present invention. Referring to FIG. 12, the UE may include a transceiver unit 1210 and a control unit 1220.

The transceiver unit 1210 sends and receives signals to and from the ENB via a wireless interface. In particular, the transceiver unit 1210 may receive D2D-related information from the serving ENB.

The control unit 1220 controls signal flows between internal blocks for UE operation. In particular, the control unit 1220 may control the transmit power of a discovery signal for D2D communication on the basis of D2D information received from the serving ENB. To this end, the control unit 1220 may include a power controller 1221.

The power controller 1221 may receive power offset information related to DRBs from the ENB and control the transmit power of a discovery signal for D2D communication on the basis of the received information. As the scheme for controlling the transmit power of a discovery signal has been described in detail before, a detailed description thereof is omitted herein.

According to the present invention, in a wireless communication system where D2D communication and wireless cellular communication coexist with each other, it is possible to control the transmit power of a D2D discovery signal so that interference of D2D communication to wireless cellular communication is minimized.

Hereinabove, exemplary embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

The invention claimed is:

1. A method for communication of a terminal in a mobile communication system, the method comprising:

receiving, from a base station, configuration information including information on a transmission power offset for a discovery signal;

identifying a transmission resource for the discovery signal on a symbol in a discovery duration and a resource for a physical uplink control channel on the symbol in the discovery duration;

determining an offset value for a transmission power of the discovery signal based on the information on the transmission power offset and a location relationship between the transmission resource for the discovery signal on the symbol in the discovery duration and the resource for the physical uplink control channel on the symbol in the discovery duration;

determining the transmission power of the discovery signal based on the offset value; and transmitting the discovery signal based on the transmission power.

2. The method of claim 1, wherein the offset value is a negative value, and
wherein an absolute value of the offset value corresponds to a distance between a location of the transmission resource for the discovery signal and a location of the transmission resource for the physical uplink control channel.

3. The method of claim 1, wherein the transmission power is determined based on frequency information of the transmission resource for the discovery signal.

4. The method of claim 1, further comprising receiving, from the base station, a reference signal,
wherein the transmission power is determined based on a path loss identified based on the received reference signal.

5. A method for communication of a base station in a mobile communication system, the method comprising:
identifying configuration information including information on a transmission power offset for a discovery signal; and
transmitting, to a terminal, the configuration information,
wherein an offset value for a transmission power of the discovery signal is determined based on the information on the transmission power offset and a location relationship between a transmission resource for the discovery signal on a symbol in a discovery duration and a resource for a physical uplink control channel on a symbol in a discovery duration,
wherein the transmission power of the discovery signal is determined based on the offset value.

6. The method of claim 5, wherein the offset value is a negative value, and
wherein an absolute value of the offset value corresponds to a distance between a location of the transmission resource for the discovery signal and a location of the resource for the physical uplink control channel.

7. The method of claim 5, wherein the transmission power is determined based on frequency information of the transmission resource for the discovery signal.

8. The method of claim 5, further comprising transmitting, to the terminal, a reference signal,
wherein the transmission power is determined based on a path loss identified based on the transmitted reference signal.

9. A terminal in a mobile communication system, the terminal comprising:
a transceiver; and
a controller coupled with the transceiver and configured to:

receive, from a base station, configuration information including information on a transmission power offset for a discovery signal, identify a transmission resource for the discovery signal on a symbol in a discovery duration and a resource for a physical uplink control channel on the symbol in the discovery duration, determine an offset value for a transmission power of the discovery signal based on the information on the transmission power offset and a location relationship between the transmission resource for the discovery signal on the symbol in the discovery duration and a resource for the physical uplink control channel on the symbol in the discovery duration, determine the transmission power of the discovery signal based on the offset value, and transmit the discovery signal based on the transmission.

10. The terminal of claim 9, wherein the offset value is a negative value, and
wherein an absolute value of the offset value corresponds to a distance between a location of the transmission resource for the discovery signal and a location of the resource for the physical uplink control channel.

11. The terminal of claim 9, wherein the transmission power is determined based on frequency information of the transmission resource for the discovery signal.

12. The terminal of claim 9, wherein the controller in further configured to receive, from the base station, a reference signal,
wherein the transmission power is determined based on a path loss identified based on the received reference signal.

13. A base station in a mobile communication system, the base station comprising:
a transceiver; and
a controller coupled with the transceiver and configured to:
identify configuration information including information on a transmission power offset for a discovery signal, and
transmit, to a terminal, the configuration information,
wherein an offset value for a transmission power of the discovery signal is determined based on the information on the transmission power offset and a location relationship between a transmission resource for the discovery signal on a symbol in a discovery duration and a resource for a physical uplink control channel on the symbol in the discovery duration, and
wherein the transmission power of the discovery signal is determined based on the offset value.

14. The base station of claim 13, wherein the offset value is a negative value, and
wherein an absolute value of the offset value corresponds to a distance between a location of the transmission resource for the discovery signal and a location of the resource for the physical uplink control channel.

15. The base station of claim 13, wherein the transmission power is determined based on frequency information of the transmission resource for the discovery signal.

16. The base station of claim 13, wherein the controller is further configured to transmit, to the terminal, a reference signal,
wherein the transmission power is determined based on a path loss identified based on the transmitted reference signal.

* * * * *